United States Patent [19]

Yasukawa et al.

[11] Patent Number: 4,616,271
[45] Date of Patent: Oct. 7, 1986

[54] DIGITAL AUDIO SYSTEM WITH AUTOMATIC FADE IN AND FADE OUT OPERATIONS

[75] Inventors: Kenichiro Yasukawa; Toshio Hirano; Masayuki Yoshida; Junichi Yoshio, all of Tokorozawa, Japan

[73] Assignee: Pioneer Electronic Corporation, Tokyo, Japan

[21] Appl. No.: 674,667

[22] Filed: Nov. 26, 1984

[30] Foreign Application Priority Data

Nov. 25, 1983 [JP] Japan .................... 58-221914

[51] Int. Cl.⁴ .................. G11B 5/02; G11B 5/09
[52] U.S. Cl. .......................... 360/32; 360/39; 381/107
[58] Field of Search ............ 360/32, 39, 40, 67; 340/347 DA; 381/107, 108, 109; 84/DIG. 26, DIG. 4, 1.24; 369/174; 370/9; 375/22

[56] References Cited

U.S. PATENT DOCUMENTS

| | | | |
|---|---|---|---|
| 4,032,224 | 6/1977 | Wray | 360/67 |
| 4,051,539 | 9/1977 | Geddes et al. | 370/9 |
| 4,406,923 | 9/1983 | Burne, III et al. | 381/108 |
| 4,434,325 | 2/1984 | Kobayashi et al. | 381/104 |
| 4,435,833 | 3/1984 | Thakkar | 381/109 |

FOREIGN PATENT DOCUMENTS 2054994 2/1985 United Kingdom ............... 381/109

OTHER PUBLICATIONS

Envelope Generators & Sequencers by Don Lancaster, Popular Electronics, Jan./76, pp. 58-62.

Primary Examiner—Terrell W. Fears
Assistant Examiner—Alyssa H. Bowler
Attorney, Agent, or Firm—Fleit, Jacobson, Cohn & Price

[57] ABSTRACT

A digital audio system constructed to reproduce an audio signal by separating low frequency components of a PAM (Pulse Amplitude Modulation) signal made up of pulses being produced at predetermined time intervals and representing a predetermined audio signal, the digital audio system including a pulse width control means for varying the pulse width of each of the pulses of the PAM signal in accordance with a predetermined command signal, whereby an automatic fade in and fade out operation is performed.

1 Claim, 2 Drawing Figures

DIGITAL AUDIO SYSTEM WITH AUTOMATIC FADE IN AND FADE OUT OPERATIONS

BACKGROUND OF THE INVENTION

1. Field of the Invention

The present invention relates to a digital audio system which transmits or utilizes, as a modulation signal of a recording/playing back operation, a digital signal obtained by sampling an audio signal at predetermined time intervals, and more specifically to a digital audio system of this type provided with automatic fade in and fade out operations.

2. Description of Background Information

Digital audio systems are designed, for example, such that an audio input signal is sampled at predetermined time intervals and the sampled value is subsequently treated by a quantization process. The quantized signal is then modulated by a modulation process such as a PCM (Pulse Code Modulation) process in which an input signal is represented by combinations of pulses having either one of two binary values 0 and 1. The thus obtained digital signal, that is the PCM signal, is utilized for transmission or recording/playing back of the audio signal.

On the other hand, in playing back or recording audio signals, it is desirable that fade in and fade out operations are provided so that the volume of a desired sound is gradually reduced to remove the desired sound from a predetermined program, or the volume of a desired sound is gradually increased to insert the desired sound into the predetermined program.

In conventional digital audio systems of this type, if a fade in or fade out operation is required, it was necessary to manipulate a control means such as a volume control of an amplifier or a record level control of a tape recorder. Therefore, automatic fade in and fade out operations are desirable in order to eliminate rather troublesome manual operations by an operator or to eliminate annoying audio responses during the fade in or fade out operation which has often been caused by excessive rapid change of the volume of the sound.

SUMMARY OF THE INVENTION

An object of the invention is therefore to provide a digital audio system in which the fade in or fade out of the playback signal is automatically performed.

According to the present invention, the digital audio system is constructed such that the playback analog signal is reproduced by separating a low frequency component of a PAM (Pulse Amplitude Modulation) signal consisting of pulses having an amplitude identical with a level obtained by quantization of a sampled signal of an audio signal at predetermined sampling intervals, and being generated at predetermined intervals. The system is provided with a pulse width control means for controlling the pulse width of the above mentioned pulses.

The scope and applicability of the present invention will become apparent from the detailed description given hereinafter. However, it should be understood that the detailed description and specific examples, while indicating a preferred embodiment of the invention, is given by way of illustration only, since various changes and modifications within the spirit and scope of the invention will become apparent to those skilled in the art from this detailed description.

DETAILED DESCRIPTION OF THE PREFERRED EMBODIMENTS

Figures 1, 2B, 2C, 2D:
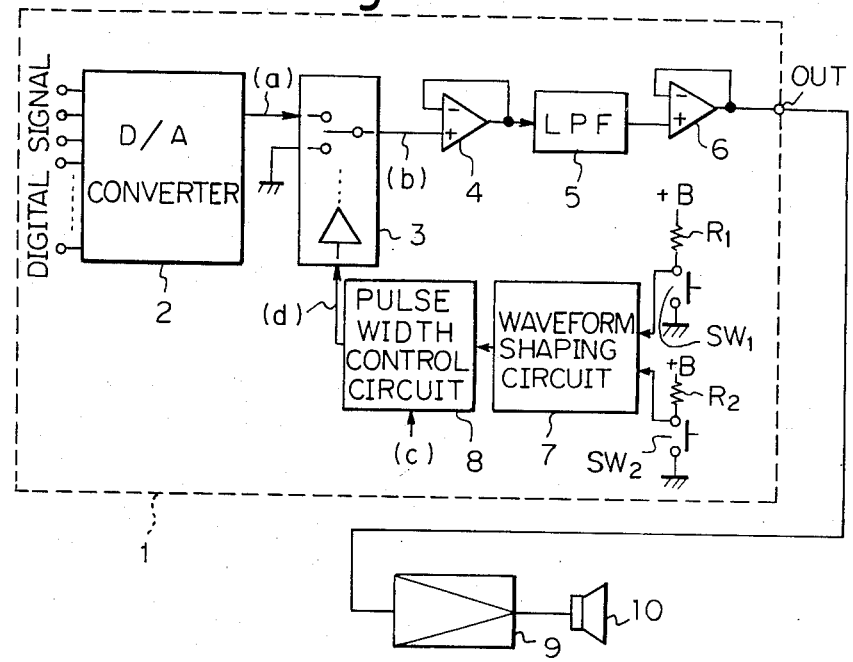
FIG. 1 is a block diagram of an embodiment of the digital audio system according to the present invention.
FIGS. 2A to 2E are waveform diagrams showing waveforms at various points of the digital audio system shown in the block diagram of FIG. 1.

Referring to FIG. 1, an embodiment of the digital audio system according to the present invention is explained.

In FIG. 1, the reference numeral 1 denotes an information playback system for playing back information recorded on such a recording medium as a digital audio disc, in which the present invention is suitably realized. In the information playback system 1, a digital signal, corresponding to a data signal, is produced by the sampling of an audio signal at intervals of a predetermined time Ts and transforming it into codes of predetermined number of bits. The digital signal is then applied to a D/A (Digital to Analog) converter 2. The D/A converter 2 is constructed to produce a signal which is identical with a signal obtained by the sampling at intervals of the time Ts and a subsequent quantization thereof, of a quantized signal (a) i.e., an audio signal having a level corresponding to the data contained in the digital signal supplied thereto.

The quantized signal output from the D/A converter 2 is in turn supplied to one of two input terminals of a change-over switch circuit 3. The other input terminal of the change-over switch circuit 3 is grounded. The change-over switch circuit 3 is constructed to selectively output the signal applied to the one of input terminals when a high level signal is applied to a control input terminal thereof, and selectively output the signal applied to the other of the input terminals when a low level signal is applied the control input terminal. The output signal (b) of this change-over switch circuit 3 is then applied to a low-pass filter 5 via a buffer amplifier 4 that provides impedance matching. The frequency characteristic of the low-pass filter 5 is determined such that the cut-off frequency is slightly higher than the highest one of frequency components which as a whole form the audio signal.

A signal output by the low-pass filter 5 is supplied to an output terminal out of the information playback system 1 via a buffer amplifier 6 that provides impedance matching.

On the other hand, a fade in switch $SW_1$ and a fade out switch $SW_2$ of non-lock type are provided and one of two input terminals of each switch $SW_1$, $SW_2$ is grounded. The fade in switch $SW_1$ and fade out switch $SW_2$ are suitably mounted on an operation panel of the information playback system 1 so as to allow a manual operation.

To a second terminal of the switches $SW_1$ and $SW_2$, a resistor R1 and a resistor R2 are connected respectively and a power voltage from a power supply is supplied therethrough.

By actuating the switch $SW_1$ or $SW_2$, e.g., by pressing a push button, the voltage level at the second terminal thereof goes to the low level and the thus produced fade in signal or fade out signal respectively is supplied to a pulse width control circuit 8 via a waveform shaping circuit 7. The waveform shaping circuit 7 is, for example, designed to eliminate chattering such that the fade in signal or the fade out signal respectively is first integrated and then waveform shaped by means of a comparator for instance.

On the other hand, the pulse width control circuit 8 is supplied with a clock pulse signal (c) having a repetition frequency identical with the sampling frequency fs (fs=1/Ts). The timing and generation of signal (d) is synchronized with the boundary of each datum supplied to the D/A converter 2.

The pulse width control circuit 8 is constructed, for example, such that a time constant of a monostable multivibrator, which is triggered a predetermined time $T_D$ after the generation of each pulse of the clock pulse signal (c), is varied in accordance with an output signal of a counter whose count value is increased or decreased by the clock pulse signal (c) when the fade in command or the fade out command is applied thereto. The output signal of the pulse width control circuit is derived at a Q output terminal of the monostable multivibrator. More specifically, the pulse width control circuit 8 produces a pulse signal of positive polarity whose pulse width is controlled to a predetermined value, 10 $\mu$s for example, when neither fade in command signal nor fade out command signal is supplied.

On the other hand, the pulse width control circuit 8 is designed such that when the fade in command signal is applied, the pulse width of the pulse signal of the positive polarity is gradually increased from value "0" to a constant value of 10 $\mu$s after the elapse of 5 seconds for instance. Similarly, when the fade out command signal is applied, the pulse width of the pulse signal of positive polarity gradually decreases from the value 10 $\mu$s to the value "0" after the elapse of 5 seconds.

The output signal (d) of the pulse width control circuit 8 having the above characteristics is in turn supplied to a control input terminal of the change-over switch circuit 3.

The output signal derived at the output terminal of the thus constructed information playback system is amplified by an amplifier 9 and the amplified signal is then applied to a speaker 10.

Figure 2A:
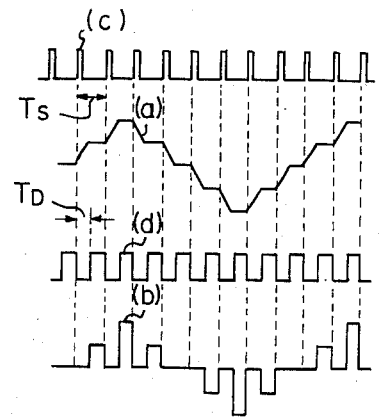

With the above system, the timing of the level change of the quantized signal (a) from the D/A converter 2 is synchronized with the timing of the generation of the clock pulse signal (c) both illustrated in FIG. 2A. It is to be noted that a noise component generally called "glitch" is associated with the quantized signal (a) around the points of level change thereof. The generation of "glitch" noise is due to the presence of a settling time i.e., the time required for the production of the output signal after the application of the digital input signal, of the D/A converter 2.

As a result, the quantized signal (a) has a waveform as illustrated in FIG. 2B.

In this construction, the timing of the generation of the positive pulse signal from the pulse width control circuit 8 is deteremined such that the level of the output signal (d) to be supplied to the control input terminal of the change-over switch circuit 3 becomes high only when the level of the quantized signal corresponds to the specific digital data.

Accordingly, only portions of the quantized signal (a) having the level corresponding to the digital data are selectively output at the output terminal of the change-over switch circuit 3. In other periods which correspond to other portions of the quantized signal, the signal level at the output terminal of the change-over switch 3 becomes equal to the ground level.

Figure 2E:

Therefore, the output signal (b) of the change-over switch 3 becomes a PAM signal constituted of pulses having an amplitude equal to the level corresponding to the digital data, as illustrated in FIG. 2D, and which are produced at predetermined intervals Ts. By applying output signal (b) of the change-over switch circuit 3 to the low pass filter 5, the frequency components which are out of the frequency range of the audio signal are rejected and a playback audio signal having the waveform illustrated in FIG. 2E is obtained at the output terminal OUT of the information playback system.

Under this condition, when the fade out switch $SW_1$ is actuated, the pulse width of the positive pulse signal produced by the pulse width control circuit 8 is gradually increased from the value "0" and reaches the constant value of 10 $\mu$s after the elapse of 5 seconds. As a result, the pulse width of each of the pulses, forming the PAM signal at the output signal of the change-over switch 3, is gradually increased thereby increasing the power of the PAM signal.

In this way, the level of the analog output signal derived at the output terminal OUT gradually increases and thus the fade in of the playback signal is automatically effected.

On the other hand, when the fade out switch $SW_3$ is actuated, the pulse width of the positive pulse signal from the pulse width control circuit 8 is gradually decreased from the value of 10 $\mu$s and reaches the value "0" after the lapse of 5 seconds. Accordingly, the pulse width of each of the pusles, forming the PAM signal at the output of the change-over switch circuit 3, is gradually decreased thereby reducing the power of the PAM signal. As a result, the level of the playback analog signal derived at the output terminal OUT of the information playback system is gradually decreased.

The fade out is thus performed automatically.

It will be appreciated from the foregoing, according to the present invention, a digital audio system is constructed to automatically perform the fade in and fade out by controlling the pulse width of pulses forming a PAM signal to be supplied to the low pass filter. Thus, the operation of the system is improved and the amount of change in the volume of sound is suitably controlled. Thus, the abrupt audio disturbances, noted during the fade in or fade out period experienced in the conventional systems, are eliminated.

Further, there is another advantage in that the system does not require any additional elements such as switches in addition to the minimum components of the digital audio system, and the cost of the system can be minimized.

In addition, it should be understood, although the system according to the present invention has been described by way of an example in which the D/A converter 2 is supplied with a data from a single channel, the present invention is not limited to this type of application. As an example, by using a circuit having a de-multiplex function as the change-over switch circuit 3, signals of a plurality of channels can be applied to the D/A converter 2, and in such a case, the fade in and the fade out of the signal of a plurality of channels can be performed at the same time.

What is claimed is:

1. A digital audio system comprising:
   a digital to analog converter for conerting an input digital signal to an analog signal;

a switching means connected to said digital to analog converter or transmitting said analog signal from said digital to analog converter when control pulse signals of a predetermined level are applied thereto;

a low pass filter connected to said switching means for permitting signals within an audio signal range;

a fade in switch for generating a fade in command signal;

a fade out switch for generating a fade out command signal; and pulse width control means for gradually increasing the pulse width of said control pulse signals within a predetermined variation range, in accordance with said fade in command signal and for decreasing the pulse width of said control pulse signals within said predetermined variation range, in response to said fade out command signal, whereby the level of signal output by said low pass filter is gradually varied in accordance with the variation of the pulse width of said control pulse signals.

* * * * *